US012002398B2

(12) United States Patent
Hashimoto et al.

(10) Patent No.: US 12,002,398 B2
(45) Date of Patent: Jun. 4, 2024

(54) ELECTRONIC DEVICE

(71) Applicant: Innolux Corporation, Miao-Li County (TW)

(72) Inventors: Kazuyuki Hashimoto, Miao-Li County (TW); Kung-Chen Kuo, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/897,225

(22) Filed: Aug. 29, 2022

(65) Prior Publication Data

US 2023/0169902 A1 Jun. 1, 2023

Related U.S. Application Data

(60) Provisional application No. 63/284,644, filed on Dec. 1, 2021.

(51) Int. Cl.
*G09G 3/20* (2006.01)
*G09G 3/32* (2016.01)
*G09G 3/3233* (2016.01)

(52) U.S. Cl.
CPC ....... *G09G 3/20* (2013.01); *G09G 2300/0842* (2013.01); *G09G 2300/0861* (2013.01); *G09G 2320/0219* (2013.01)

(58) Field of Classification Search
None
See application file for complete search history.

(56) References Cited

U.S. PATENT DOCUMENTS 9,001,113 B2 * 4/2015 Guo ..................... G09G 3/3233 345/76
9,721,507 B2 * 8/2017 Han ......................... G09G 3/32
2005/0200572 A1 * 9/2005 Weng ................... G09G 3/3241 345/76
2006/0077134 A1 * 4/2006 Hector ................. G09G 3/3233 345/76
2006/0208971 A1 * 9/2006 Deane .................. G09G 3/3233 345/76
2007/0287237 A1 * 12/2007 Rockenberger ..... H01L 29/4908 257/E29.147
2008/0252573 A1 * 10/2008 Fish ..................... G09G 3/3275 345/80
2009/0073092 A1 * 3/2009 Numao ................ G09G 3/3233 345/76
2011/0164018 A1 * 7/2011 Kang ................... G09G 3/3233 345/76
2011/0227890 A1 9/2011 Lee
(Continued)

OTHER PUBLICATIONS

"Search Report of Europe Counterpart Application", dated Apr. 18, 2023, p. 1-p. 8.

*Primary Examiner* — Sepehr Azari
(74) *Attorney, Agent, or Firm* — JCIPRNET

(57) ABSTRACT

An electronic device is provided. The electronic device includes a first scan transistor, a driving transistor, an electronic component and a first capacitive coupling component. The driving transistor is electrically connected to the first scan transistor. The electronic component is electrically connected to the driving transistor. The first terminal of the first capacitive coupling component is electrically connected to a control terminal of the driving transistor.

20 Claims, 9 Drawing Sheets

(56) References Cited

U.S. PATENT DOCUMENTS

| | | | | |
|---|---|---|---|---|
| 2013/0335399 | A1* | 12/2013 | Tsuge | G09G 3/3233 345/212 |
| 2014/0159609 | A1* | 6/2014 | Xie | H10K 59/1216 257/40 |
| 2015/0130779 | A1* | 5/2015 | Chang | G09G 3/3233 345/212 |
| 2015/0154906 | A1* | 6/2015 | Chung | G09G 3/3233 345/212 |
| 2018/0286307 | A1 | 10/2018 | Kim et al. | |
| 2019/0385521 | A1* | 12/2019 | Mao | G09G 3/3648 |
| 2020/0342809 | A1* | 10/2020 | Park | G09G 3/3258 |
| 2021/0065624 | A1* | 3/2021 | Li | G09G 3/3291 |

* cited by examiner

ELECTRONIC DEVICE

CROSS-REFERENCE TO RELATED APPLICATION

This application claims the priority benefits of U.S. provisional application Ser. No. 63/284,644, filed on Dec. 1, 2021. The entirety of the above-mentioned patent application is hereby incorporated by reference herein.

BACKGROUND

Technical Field

The disclosure relates a device, particularly, the disclosure relates to an electronic device.

Description of Related Art

In general, the voltage source circuit is controlled with the data voltage passed through a scan transistor. However, the scan transistor may include the clock feedthrough effect, and the clock feedthrough effect may cause the data voltage shift and makes control accuracy worse. In this regard, the existing technical means is to increase the size of the storage capacitor to maintain the data voltage and reduce the impact of clock feedthrough. But this countermeasure makes layout difficult, requiring larger scan transistors to charge the storage capacitor if scan time is tight. However, increasing the size of the scan transistors will make the clock feedthrough effect larger and may be mitigated by a larger storage capacitor.

SUMMARY

The electronic device of the disclosure includes a first scan transistor, a driving transistor, an electronic component and a first capacitive coupling component. The driving transistor is electrically connected to the first scan transistor. The electronic component is electrically connected to the driving transistor. The first terminal of the first capacitive coupling component is electrically connected to a control terminal of the driving transistor.

Based on the above, according to the electronic device of the disclosure, the electronic device can effectively drive the electronic component by reducing or eliminating the clock feedthrough effect.

To make the aforementioned more comprehensible, several embodiments accompanied with drawings are described in detail as follows.

BRIEF DESCRIPTION OF THE DRAWINGS

The accompanying drawings are included to provide a further understanding of the disclosure and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
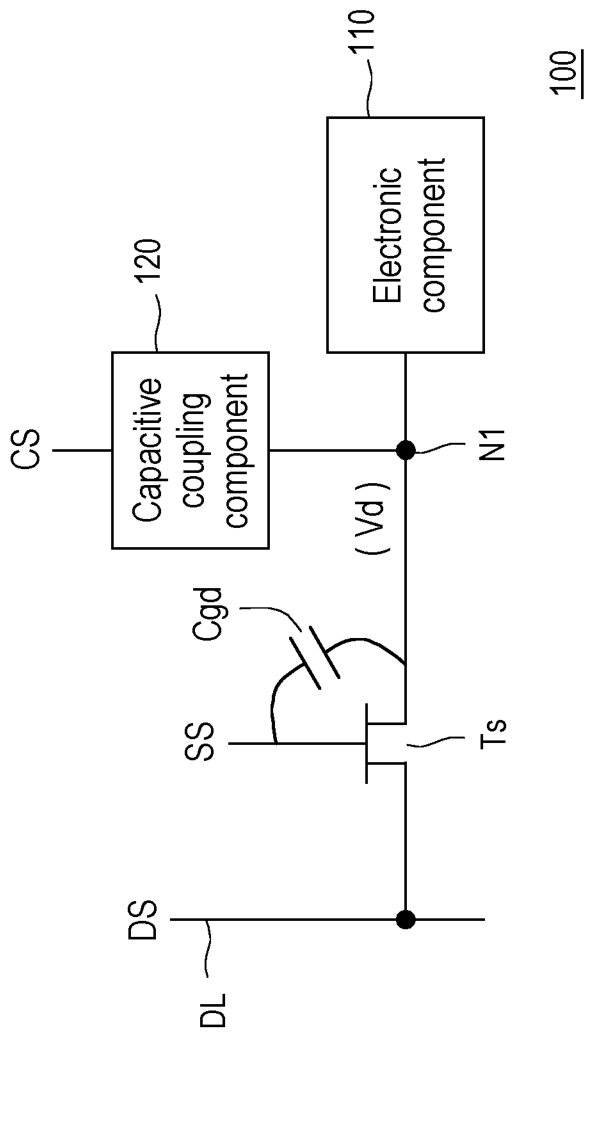
FIG. 1 is a schematic diagram of an electronic device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as “comprise” and “include” are open-ended terms, and should be explained as “including but not limited to . . . ”.

The term “coupling (or electrically connection)” used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms “first”, “second”, and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

The electronic device of the disclosure may include, for example, an active-matrix device including a plurality of data lines, a plurality of scan lines and a pixel array. The electronic component may correspond to one pixel unit of the pixel array. The electronic component of the disclosure may be a voltage-controlled device, and the voltage-controlled device may include, for example, a varactor, a tunable component, a liquid crystal unit, or the voltage-controlled device (or voltage-controlled circuit) may be used to control a light-emitting diode (LED) with current. It should be noted that, the electronic device of the disclosure may be manufactured using a display panel process, and related transistors and electronic components are fabricated on a glass substrate.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

FIG. 1 is a schematic diagram of an electronic device according to an embodiment of the disclosure. Referring to FIG. 1, an electronic device 100 includes an electronic component 110, a capacitive coupling component 120, a scan transistor Ts and a data line DL. The electronic component 110 is electrically connected to the scan transistor Ts and a capacitive coupling component 120 through a node N1. A first terminal of the scan transistor Ts is electrically connected to the data line DL. A second terminal of the scan transistor Ts is electrically connected to the electronic component 110 and the capacitive coupling component 120 through the node N1. The capacitive coupling component 120 may further electrically connected to a compensation signal CS. A control terminal of the scan transistor Ts is electrically connected to a scan signal SS. In the embodiment of the disclosure, the scan transistor Ts may be an N-type transistor or a P-type transistor. In addition, in some embodiment of the disclosure, the electronic device 100 may further include a storage capacitor, and the storage capacitor is electrically connected to the node N1.

In the embodiment of the disclosure, the scan transistor Ts transfers a data voltage to the node N1 according to a data signal DS transmitted by the data line DL, so as to drive the electronic component 110. During the scan transistor Ts is switched from turn-on to turn-off, the control terminal and the second terminal of the scan transistor Ts may have a coupling capacitor Cgd, which may cause the clock feedthrough effect at the node N1. In the embodiment of the disclosure, the capacitive coupling component 120 may compensate the clock feedthrough effect according to the compensation signal CS.

Figure 2A:
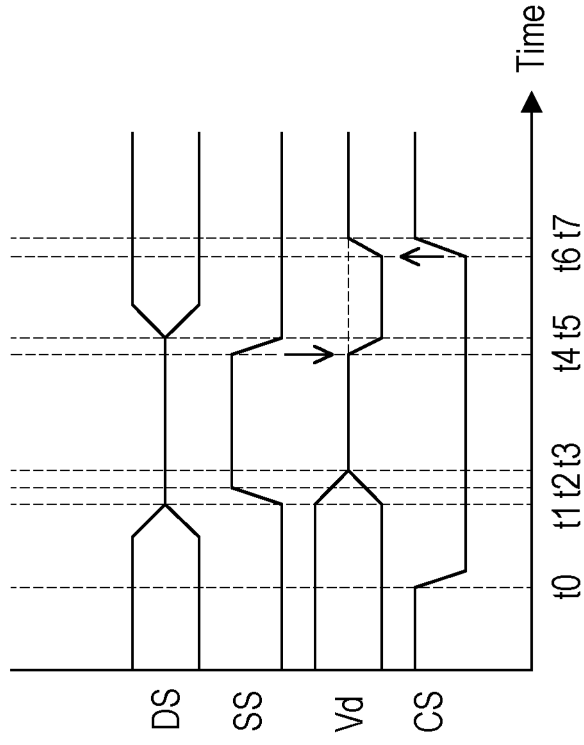
FIG. 2A is a timing diagram of related voltages and signals according to the embodiment of FIG. 1 of the disclosure.

FIG. 2A is a timing diagram of related voltages and signals according to the embodiment of FIG. 1 of the disclosure. Referring to FIG. 1 and FIG. 2A, in the embodiment of the disclosure, assuming that the scan transistor Ts is the N-type transistor. The voltage of the compensation signal CS provided by the capacitive coupling component 120 may change to the low voltage level at time t0, and may change to the high voltage level at time t6. During a period from time t1 to time t5, the data signal DS may have a data voltage, and the control terminal of the scan transistor Ts receives the scan signal SS. Form time t1 to time t2, the voltage of the scan signal SS rises from the low voltage level to the high voltage level. Thus, the node voltage Vd of the node N1 changes to the data voltage during the period from time t1 to time t3. Form time t4 to time t5, the scan signal SS falls from the high voltage level to the low voltage level, and the node voltage Vd of the node N1 fall during the period because the clock feedthrough effect caused by the coupling capacitor Cgd.

In the embodiment of the disclosure, form time t6 to time t7, the compensation signal CS provided by the capacitive coupling component 120 rises from the low voltage level to the high voltage level. Thus, the node voltage Vd of the node N1 may be compensated by the voltage rise of the compensation signal CS, thereby effectively maintaining the node voltage Vd of the node N1 at the data voltage after the scan transistor Ts is turned-off.

Figure 2B:
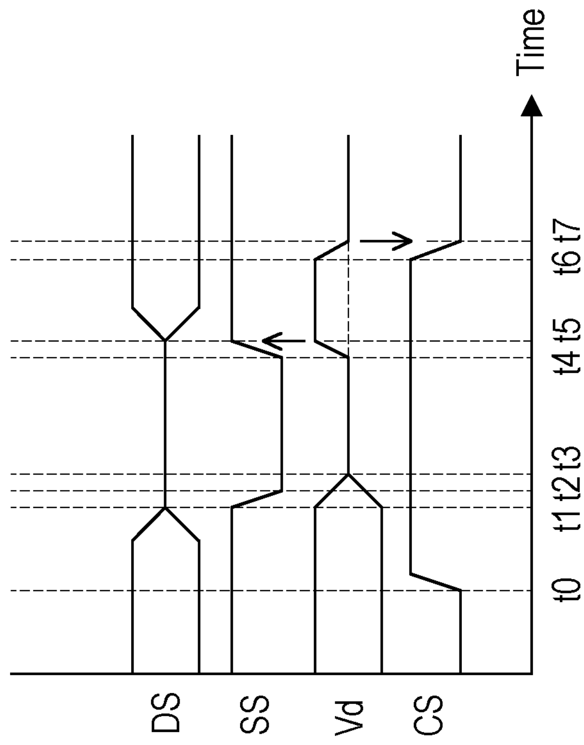
FIG. 2B is another timing diagram of related voltages and signals according to the embodiment of FIG. 1 of the disclosure.

FIG. 2B is another timing diagram of related voltages and signals according to the embodiment of FIG. 1 of the disclosure. Referring to FIG. 1 and FIG. 2B, in the embodiment of the disclosure, assuming that the scan transistor Ts is the P-type transistor. The voltage of the compensation signal CS provided by the capacitive coupling component 120 may change to the high voltage level at time t0, and may change to the low voltage level at time t6. During a period from time t1 to time t5, the data signal DS may have a data voltage, and the control terminal of the scan transistor Ts receives the scan signal SS. Form time t1 to time t2, the voltage of the scan signal SS falls from the high voltage level to the low voltage level. Thus, the node voltage Vd of the node N1 changes to the data voltage during the period from time t1 to time t3. Form time t4 to time t5, the scan signal SS rises from the low voltage level to the high voltage level, and the node voltage Vd of the node N1 rising because the clock feedthrough effect caused by the coupling capacitor Cgd.

In the embodiment of the disclosure, form time t6 to time t7, the compensation signal CS provided by the capacitive coupling component 120 falls from the high voltage level to the low voltage level. Thus, the node voltage Vd of the node N1 may be compensated by the voltage drop of the compensation signal CS, thereby effectively maintaining the node voltage Vd of the node N1 at the data voltage after the scan transistor is turned-off.

Figure 3A:
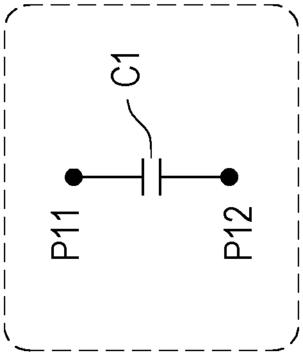
FIG. 3A is a schematic diagram of a capacitive coupling component according to an embodiment of the disclosure.

FIG. 3A is a schematic diagram of a capacitive coupling component according to an embodiment of the disclosure. Referring to FIG. 1 and FIG. 3A, the capacitive coupling component 120 of the embodiment of FIG. 1 may include a capacitor C1 as shown in FIG. 3A, and the capacitor C1 may be a metal-insulator-metal (MIM) capacitor. A first terminal of the capacitor C1 is electrically connected to the compensation signal CS through a node P11. A second terminal of the capacitor C1 is electrically connected to the node N1 through a node P12. Thus, the capacitor C1 may compensate the voltage of the node N1 according to the compensation signal CS.

Figure 3B:
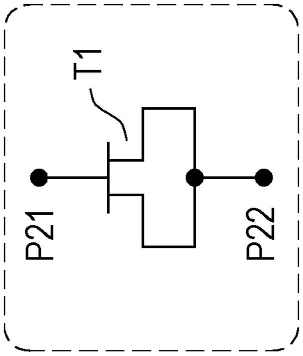
FIG. 3B is a schematic diagram of a capacitive coupling component according to another embodiment of the disclosure.

FIG. 3B is a schematic diagram of a capacitive coupling component according to another embodiment of the disclosure. Referring to FIG. 1 and FIG. 3B, the capacitive coupling component 120 of the embodiment of FIG. 1 may include a transistor T1 as shown in FIG. 3B. A control terminal of the transistor T1 is electrically connected to the compensation signal CS through a node P21. A second terminal of the transistor T1 is electrically connected to a first terminal of the transistor T1 and the node N1 through a node P22. Thus, the transistor T1 may compensate the voltage of the node N1 according to the compensation signal CS.

Figure 4:
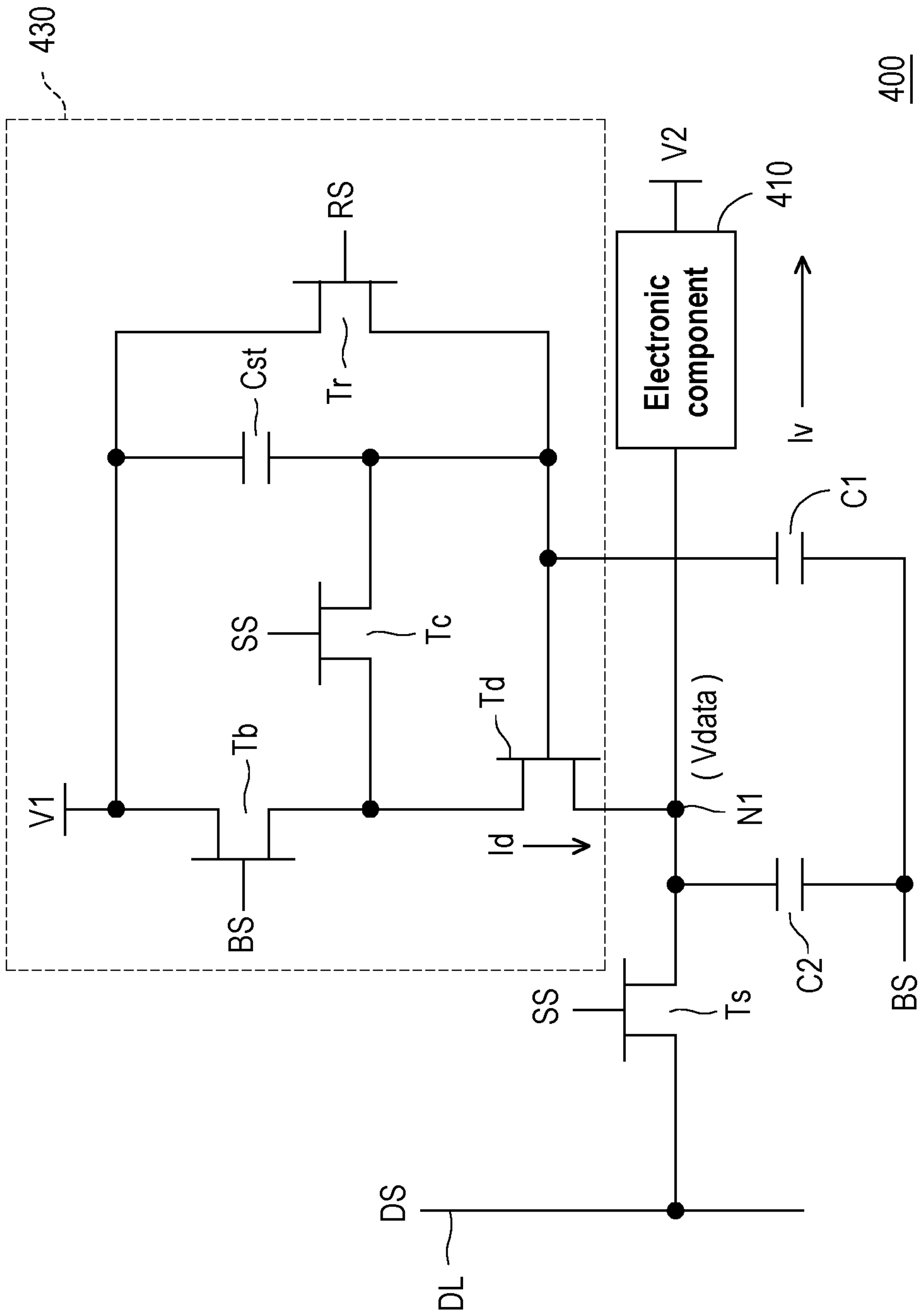
FIG. 4 is a schematic diagram of an electronic device with threshold voltage compensation according to an embodiment of the disclosure.

FIG. 4 is a schematic diagram of an electronic device with threshold voltage compensation according to an embodiment of the disclosure. Referring to FIG. 4, an electronic device 400 includes an electronic component 410, a voltage source circuit 430, a scan transistor Ts, a first capacitive coupling component, a second capacitive coupling component and data line DL. The electronic component 410 may include a varactor or other tunable component. The first capacitive coupling component is a capacitor C1 which is similar as the MIM capacitor shown in the embodiment of FIG. 3A, and the second capacitive coupling component is a capacitor C2 which is also similar as the MIM capacitor shown in the embodiment of FIG. 3A, but the disclosure is not limited thereto. In other embodiments of the disclosure, the first capacitive coupling component and the second capacitive coupling component may also be implemented as the transistor T1 of the embodiment of FIG. 3B respectively.

In the embodiment of the disclosure, the electronic component 410 is electronically connected to the scan transistor Ts and the capacitor C2 through a node N1. A first terminal of the scan transistor Ts is electrically connected to the data line DL. A second terminal of the scan transistor Ts is electrically connected to the electronic component 410 and the capacitor C2 through the node N1. A control terminal of the scan transistor Ts is electrically connected to a scan signal SS. The voltage source circuit 430 is electrically connected to the capacitor C1. A first terminal of the capacitor C2 is electrically connected to the second terminal of the scan transistor Ts and the electronic component 410 through the node N1. A first terminal of the capacitor C1 is electrically connected to the voltage source circuit 430. A second terminal of the capacitor C2 is electrically connected to a second terminal of the capacitor C1, and is electrically connected to a bias signal BS. The electronic component 410 is coupled between the node N1 and a second operation voltage V2.

In the embodiment of the disclosure, the voltage source circuit 430 includes a driving transistor Td, a compensation transistor Tc, a bias transistor Tb, a reset transistor Tr and a storage capacitor Cst. A first terminal of the driving transistor Td is electrically connected to the scan transistor Ts, the capacitor C2 and the electronic component 410 through the node N1. A second terminal of the driving transistor Td is electrically connected to the compensation transistor Tc and the bias transistor Tb. A control terminal of driving transistor Td is electrically connected to the compensation transistor Tc, the reset transistor Tr, the storage capacitor Cst and the capacitor C1. A first terminal of the bias transistor Tb is electrically connected to a first operation voltage V1. A second terminal of the bias transistor Tb is electrically connected to a first terminal of the driving transistor Td and a first terminal of the compensation transistor Tc. A control terminal of the bias transistor Tb is electrically connected to the bias signal BS. A first terminal of the storage capacitor Cst is electrically connected to the first operation voltage V1. A second terminal of the storage capacitor Cst is electrically connected to a second terminal of the compensation transistor Tc, a control terminal of the driving transistor Td and the first terminal of the capacitor C1. A first terminal of the reset transistor Tr is electrically connected to the first operation voltage V1. A second terminal of the reset transistor Tr is electrically connected to the control terminal of the driving transistor Td and the first terminal of the capacitor C1. A control terminal of the reset transistor Tr is electrically connected to a reset signal RS. In the embodiment of the disclosure, the first terminal and the second terminal of each above transistor may be a source terminal and a drain terminal, and the control terminal of the each above transistor may be a gate terminal. In the embodiment of the disclosure, the compensation transistor Tc, the bias transistor Tb and the reset transistor Tr may be an N-type transistor respectively, and the scan transistor Ts and the driving transistor Td may be an N-type transistor or a P-type transistor, respectively.

In the embodiment of the disclosure, the scan transistor Ts transfers a data voltage Vdata to the node N1 according to a data signal DS transmitted by the data line DL, and the voltage source circuit 430 may generate a compensation current Id to compensate a leakage current Iv of the electronic component 410 through the node N1 according to the data voltage Vdata. In the embodiment of the disclosure, during a scan period, the compensation transistor Tc may compensate the threshold voltage of the driving transistor Td at the control terminal (gate terminal) of the driving transistor Td. Moreover, during the bias period, the node voltage of the node N1 may be maintained at the voltage of the data voltage Vdata minus a delta voltage dV when the driving transistor Td is turned-on for providing the compensation current Id. The delta voltage dV is caused by the compensation current Id to compensate the leakage current Iv flowing through the electronic component 410 when the electronic device 400 in the current balance state. In the embodiment of the disclosure, during the scan transistor Ts and the compensation transistor Tc are switched from turn-on to turn-off, the scan transistor Ts and the compensation transistor Tc may cause the clock feedthrough effect at the node N1 and the control terminal of the driving transistor Td by a coupling capacitor between the control terminal and the second terminal of the scan transistor Ts and a coupling capacitor between the control terminal and the second terminal of the compensation transistor Tc, respectively. In the embodiment of the disclosure, the capacitor C1 and the capacitor C2 may respectively compensate the clock feedthrough effect according to the bias signal BS. In addition, in some embodiments of the disclosure, the capacitor C2 is optional.

Figure 5:
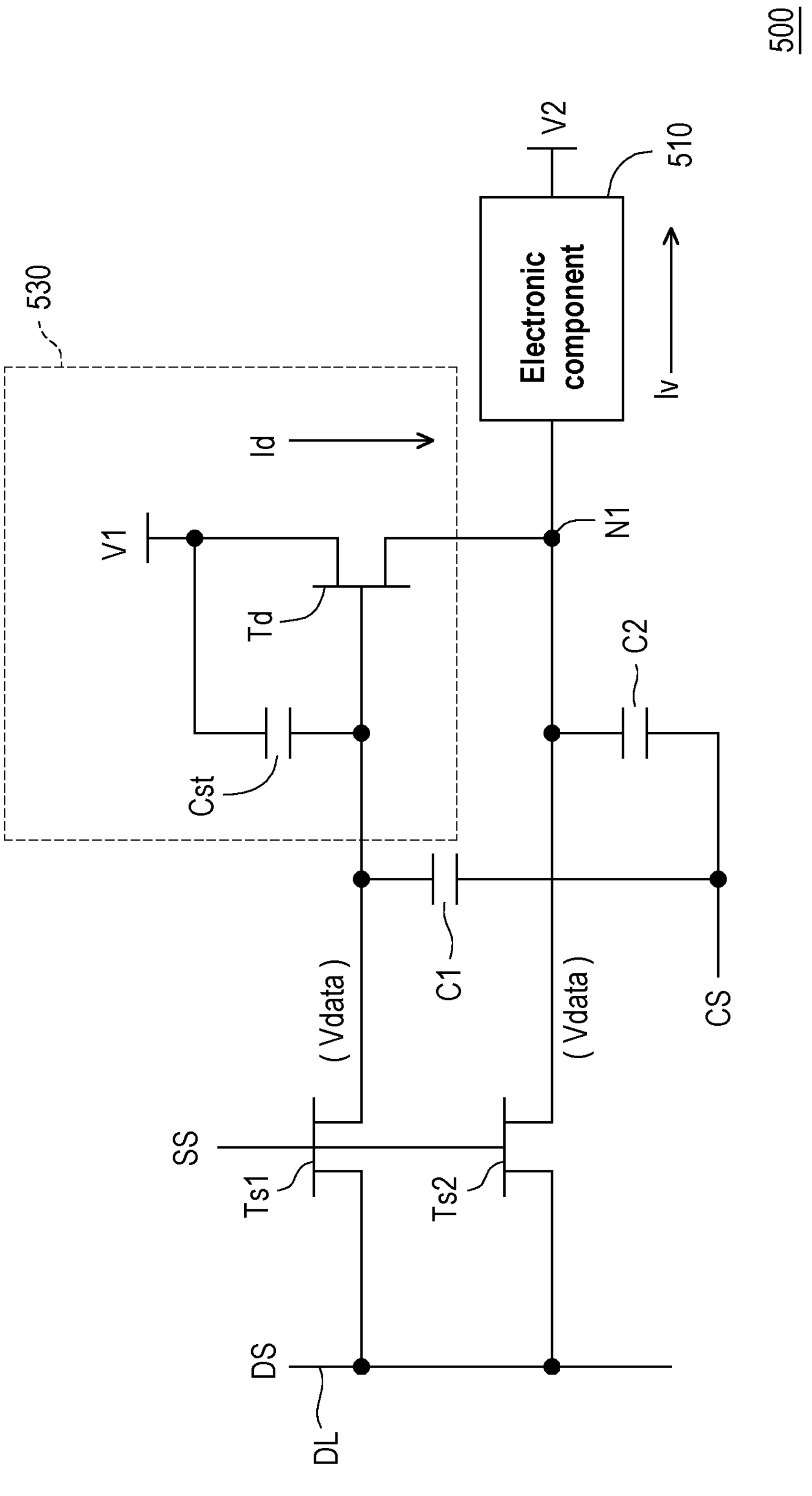
FIG. 5 is a schematic diagram of an electronic device without threshold voltage compensation according to an embodiment of the disclosure.

FIG. 5 is a schematic diagram of an electronic device without threshold voltage compensation according to an embodiment of the disclosure. Referring to FIG. 5, an electronic device 500 includes an electronic component 510, a voltage source circuit 530, a scan transistor Ts1, a scan transistor Ts2, a first capacitive coupling component, a second capacitive coupling component and data line DL. The electronic component 510 may include a varactor or other tunable component. The first capacitive coupling component is a capacitor C1 which is similar as the MIM capacitor shown in the embodiment of FIG. 3A, and the second capacitive coupling component is a capacitor C2 which is also similar as the MIM capacitor shown in the embodiment of FIG. 3A, but the disclosure is not limited thereto. In other embodiments of the disclosure, the first capacitive coupling component and the second capacitive coupling component may also be implemented as the transistor T1 of the embodiment of FIG. 3B respectively.

In the embodiment of the disclosure, the electronic component 510 is electronically connected to the scan transistor Ts2 and the capacitor C2 through a node N1. A first terminal of the scan transistor Ts1 is electrically connected to the data line DL. A second terminal of the scan transistor Ts1 is electrically connected to voltage source circuit 530 and the capacitor C1. A control terminal of the scan transistor Ts1 is electrically connected to a scan signal SS. The voltage source circuit 530 is electrically connected to the capacitor C2 and the scan transistor Ts2 through the node N1. A first terminal of the scan transistor Ts2 is electrically connected to the data line DL. A second terminal of the scan transistor Ts2 is electrically connected to the voltage source circuit 530 and the capacitor C2. A control terminal of the scan transistor Ts2 is electrically connected to a scan signal SS. A first terminal of the capacitor C1 is electrically connected to the second terminal of the scan transistor Ts1 and the voltage source circuit 530. A first terminal of the capacitor C2 is electrically connected to the voltage source circuit 530 and the second terminal of the scan transistor Ts2 through the node N1. A second terminal of the capacitor C1 is electrically connected to a second terminal of the capacitor C2, and is electrically connected to a compensation signal CS. The electronic component 510 is coupled between the node N1 and a second operation voltage V2.

In the embodiment of the disclosure, the voltage source circuit 530 includes a driving transistor Td and a storage capacitor Cst. A first terminal of the driving transistor Td is electrically connected to a first operation voltage V1. A second terminal of the driving transistor Td is electrically connected to the electronic component 510 and the capacitor C2 through the node N1. A control terminal of driving transistor Td is electrically connected to the second terminal of the scan transistor Ts1 and the capacitor C1. A first terminal of the storage capacitor Cst is electrically connected to the first operation voltage V1. A second terminal of the storage capacitor Cst is electrically connected to the control terminal of the driving transistor Td. In the embodiment of the disclosure, the first terminal and the second terminal of the driving transistor Td may be a source terminal and a drain terminal and the control terminal of the driving transistor Td may be a gate terminal. In the embodiment of the disclosure, the scan transistor Ts1, the scan transistor Ts2 and the driving transistor Td may be an N-type transistor or a P-type transistor, respectively.

In the embodiment of the disclosure, the scan transistor Ts1 transfers a data voltage Vdata to the control terminal of the driving terminal Td according to a data signal DS transmitted by the data line DL, and scan transistor Ts2 also transfers the data voltage Vdata to the node N1 according to the data signal DS transmitted by the data line DL. The voltage source circuit 530 may generate a compensation current Id to compensate a leakage current Iv of the electronic component 510 through the node N1 according to the data voltage Vdata. In the embodiment of the disclosure, during the scan transistor Ts1 and the scan transistor Ts2 are switched from turn-on to turn-off at the same time, the scan transistor Ts1 and the scan transistor Ts2 may cause the clock feedthrough effect at the control terminal of the driving transistor Td and the node N1 by a coupling capacitor between the control terminal and the second terminal of the scan transistor Ts1 and a coupling capacitor between the control terminal and the second terminal of the scan transistor Ts2, respectively. In the embodiment of the disclosure, the capacitor C1 and the capacitor C2 may respectively compensate the clock feedthrough effect according to the compensation signal CS. In addition, in some embodiments of the disclosure, the capacitor C1 is optional.

Figure 6:
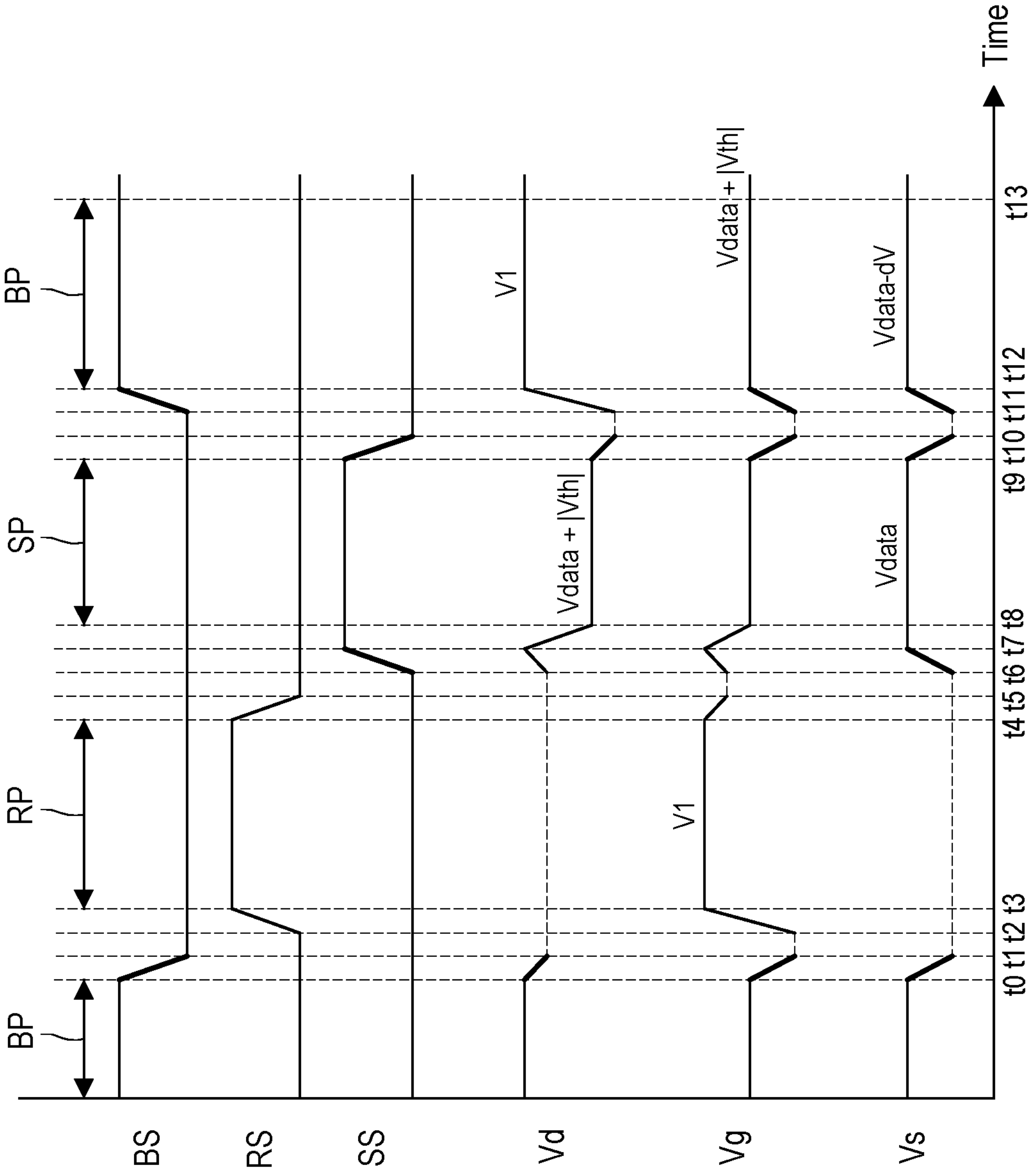
FIG. 6 is a timing diagram of related voltages and signals according to the embodiment of FIG. 4 of the disclosure.

FIG. 6 is a timing diagram of related voltages and signals according to the embodiment of FIG. 4 of the disclosure. Referring to FIG. 4 and FIG. 6, the electronic device 400 may be operated at a bias period BP, a reset period RP and a scan period SP. During the period from time t0 to time t1, the bias signal BS changes to the low voltage level, the reset signal RS and the scan signal SS maintain at the low voltage level, respectively. The voltages Vd, Vg and Vs of the first, second and control terminal of the driving transistor Td fall simultaneously. During the period from time t2 to time t3, the reset signal RS rise to the high voltage level, so the voltage Vg of the control terminal of the driving transistor Td rises to the first operation voltage V1. During the reset period RS from time t3 to time t4, the voltage Vg of the control terminal of the driving transistor Td is maintained at the first operation voltage V1. During the period from time t4 to time t5, the reset signal RS falls to the low voltage level, so the voltage Vg of the control terminal of the driving transistor Td falls simultaneously.

During the period from time t6 to time t7, the scan signal SS changes to the high voltage level, the reset signal RS and the bias signal BS maintain at the low voltage level, respectively. The voltages Vd, Vg and Vs of the first, second and control terminals of the driving transistor Td rise simultaneously. During the period from time t8 to time t9, the voltage Vs of the second terminal of the driving transistor Td changes to the data voltage Vdata. The voltages Vd and Vg of the first and control terminals of the driving transistor Td changes to the voltage of the data voltage Vdata plus the absolute value of threshold voltage Vth of the driving transistor Td.

During the scan period SP from time t9 to time t10, the scan signal SS falls to the low voltage level, so the voltages Vd, Vg and Vs of the first, second and control terminals of the driving transistor Td fall simultaneously because the clock feedthrough effect. During the bias period BP from time t11 to time t12, the bias signal BS rises to high voltage level. At the same time, the capacitor C1 and the capacitor C2 may respectively compensate the clock feedthrough effect according to the bias signal BS. Thus, the voltage Vg of the control terminal of the driving transistor Td rises to the voltage of the data voltage Vdata plus the absolute value of threshold voltage Vth of the driving transistor Td, and the voltage Vs of the second terminal of the driving transistor recovers.

Therefore, during the period from time t12 to time t13, the voltage Vg of the control terminal of the driving transistor Td rises to the voltage of the data voltage Vdata plus the absolute value of threshold voltage Vth of the driving transistor Td. Moreover, the voltage Vs of the control terminal of the driving transistor Td and the node voltage of the node N1 may recovery to the voltage of the data voltage Vdata minus a delta voltage dV when the driving transistor Td is turned-on for providing the compensation current Id. The delta voltage dV is caused by the compensation current Id to compensate the leakage current Iv flowing through the voltage source circuit 430 when the electronic device 400 in the current balance state. In addition, the relevant voltages and signals in the above-mentioned embodiment of FIG. 5 may also be analogized by this embodiment, so as to realize clock feedthrough effect compensation.

Figure 7:
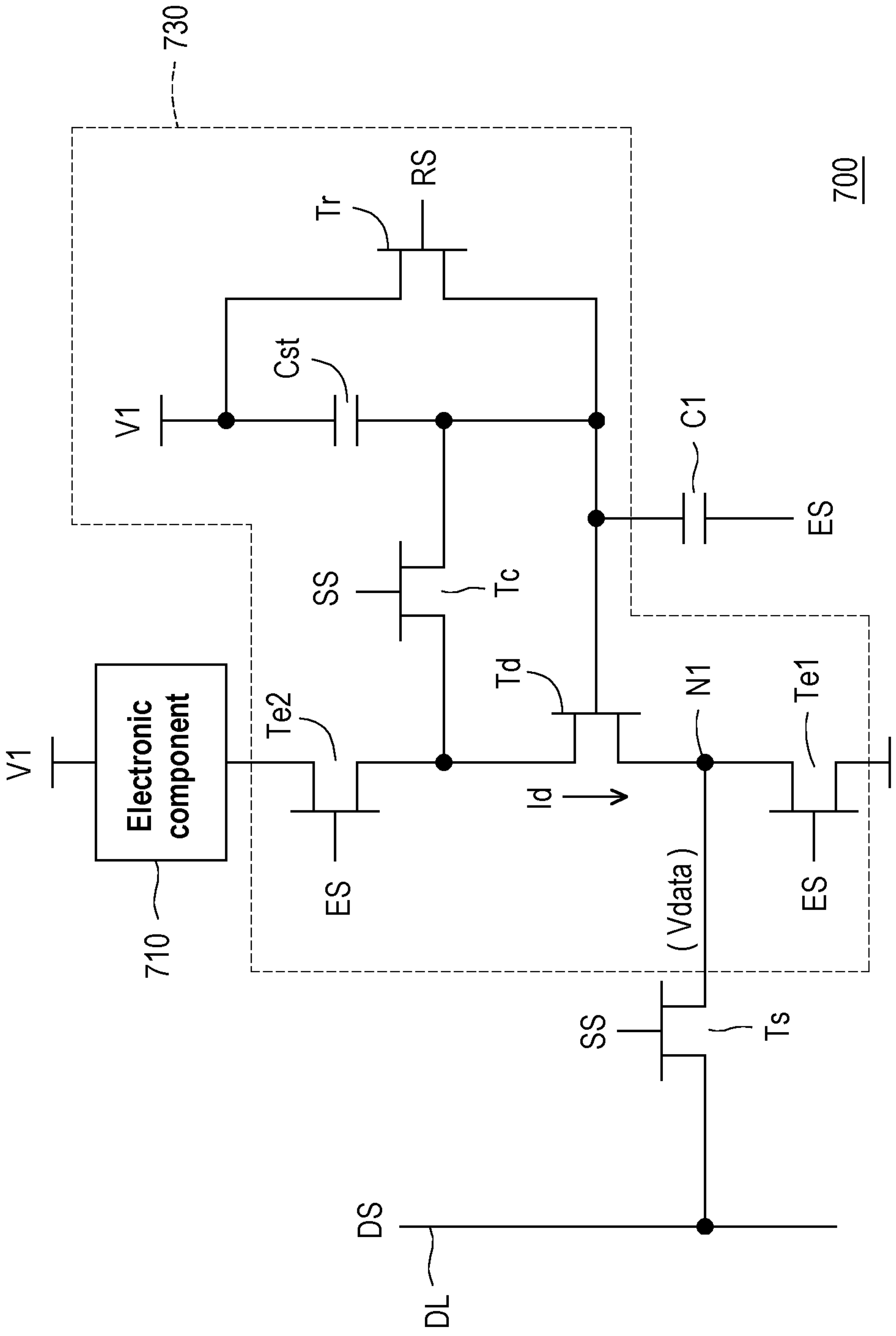
FIG. 7 is a schematic diagram of an electronic device with threshold voltage compensation according to an embodiment of the disclosure.

FIG. 7 is a schematic diagram of an electronic device with threshold voltage compensation according to an embodiment of the disclosure. Referring to FIG. 7, an electronic device 700 includes an electronic component 710, a current sink circuit 730, a scan transistor Ts, a capacitive coupling component and data line DL. The electronic component 710 may include a light-emitting diode. The capacitive coupling component is a capacitor C1 which is similar as the MIM capacitor shown in the embodiment of FIG. 3A, but the disclosure is not limited thereto. In other embodiments of the disclosure, the capacitive coupling component may also be implemented as the transistor T1 of the embodiment of FIG. 3B.

In the embodiment of the disclosure, the electronic component 710 is electronically connected between a first operation voltage V1 and the current sink circuit 730. A first terminal of the scan transistor Ts is electrically connected to the data line DL. A second terminal of the scan transistor Ts is electrically connected to the current sink circuit 730 through a node N1. A control terminal of the scan transistor Ts is electrically connected to a scan signal SS. A first terminal of the capacitor C1 is electrically connected to the current sink circuit 730. A second terminal of the capacitor C1 is electrically connected to an emission signal ES.

In the embodiment of the disclosure, the current sink circuit 730 includes a driving transistor Td, a compensation transistor Tc, an emission transistor Te1, an emission transistor Te2, a reset transistor Tr and a storage capacitor Cst. In the embodiment of the disclosure, a first terminal of the emission transistor Te2 is electrically connected to the electronic component 710. A second terminal of the emission transistor Te2 is electrically connected to a first terminal of the driving transistor Td and a first terminal of the compensation transistor Tc. A control terminal of the emission transistor Te2 is electrically connected to an emission signal EM. A first terminal of the storage capacitor Cst is electrically connected to a first operation voltage V1. A second terminal of the compensation transistor Tc is electrically connected to a second terminal of the storage capacitor Cst, a control terminal of the driving transistor Td and a first terminal of the capacitor C1. A control terminal of the compensation transistor Tc is electrically connected to the scan signal SS. A first terminal of the reset transistor Tr is electrically connected to the first operation voltage V1. A second terminal of the reset transistor Tr is electrically connected to the control terminal of the driving transistor Td. A control terminal of the reset transistor Tr is electrically connected to a reset signal RS. A second terminal of the driving transistor Td is electrically connected to the second terminal of the scan transistor Ts and a first terminal of the emission transistor Te1 through the node N1. A second terminal of the emission transistor Te1 is electrically connected to a second operation voltage V2. A control terminal of the emission transistor Te1 is electrically connected to the emission signal ES.

In the embodiment of the disclosure, the first terminal and the second terminal of the each above transistor may be a source terminal and a drain terminal, and the control terminal of the each above transistor may be a gate terminal. In the embodiment of the disclosure, the compensation transistor Tc, the emission transistor Te1, the emission transistor Te2, the reset transistor Tr, the scan transistor Ts and the driving transistor Td may be an N-type transistor or a P-type transistor, respectively.

In the embodiment of the disclosure, the scan transistor Ts transfers a data voltage Vdata to the node N1 according to a data signal DS transmitted by the data line DL, and the current sink circuit 730 may generate a driving current Id to drive the electronic component 710 through the node N1 according to the data voltage Vdata. In the embodiment of the disclosure, during a scan period, the compensation transistor Tc may compensate the threshold voltage of the driving transistor Td at the control terminal (gate terminal) of the driving transistor Td. Moreover, during an emission period, the voltage of the control terminal of the driving transistor Td may be maintained at the voltage of the data voltage Vdata plus the absolute value of threshold voltage Vth of the driving transistor Td. During the compensation transistor Tc is switched from turn-on to turn-off, the compensation transistor Tc may cause the clock feedthrough effect at the control terminal of the driving transistor Td by a coupling capacitor between the control terminal and the second terminal of the compensation transistor Tc. In the embodiment of the disclosure, the capacitor C1 may compensate the clock feedthrough effect according to the emission signal ES.

Figure 8:
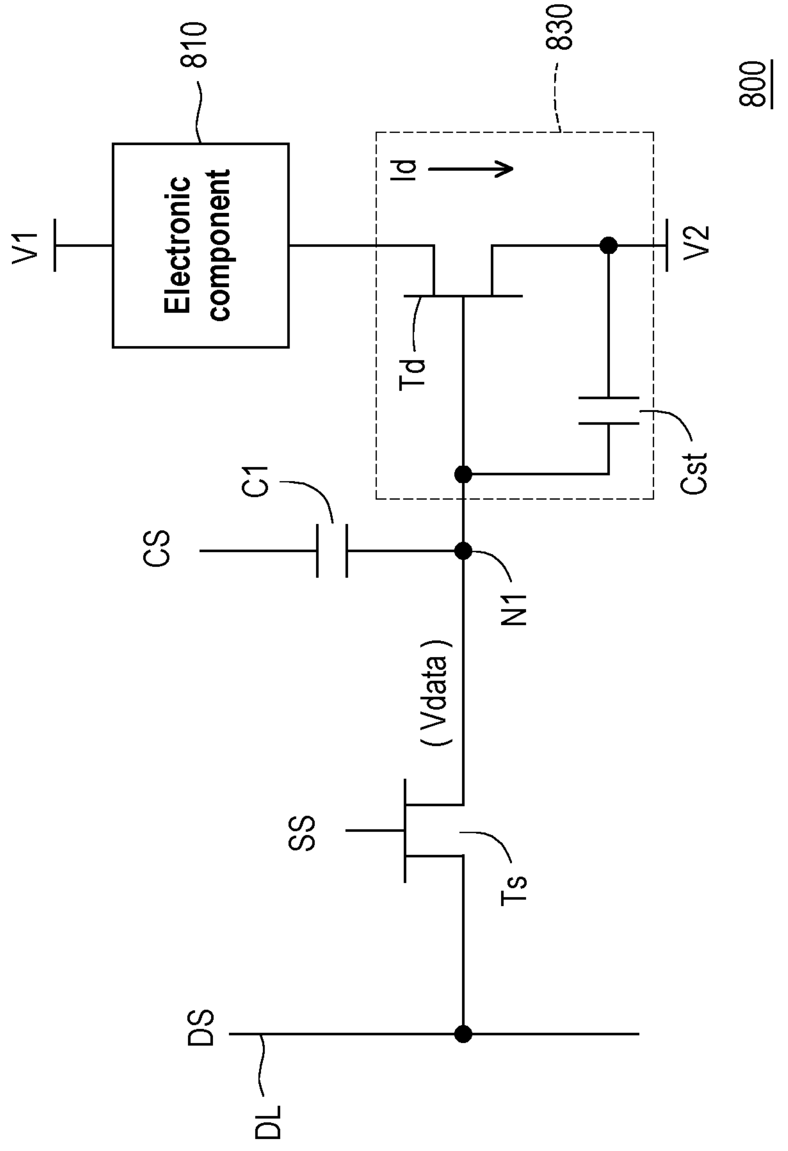
FIG. 8 is a schematic diagram of an electronic device without threshold voltage compensation according to an embodiment of the disclosure.

FIG. 8 is a schematic diagram of an electronic device without threshold voltage compensation according to an embodiment of the disclosure. Referring to FIG. 8, an electronic device 800 includes an electronic component 810, a current sink circuit 830, a scan transistor Ts, a capacitive coupling component and data line DL. The capacitive coupling component is a capacitor C1 which is similar as the MIM capacitor shown in the embodiment of FIG. 3A, but the disclosure is not limited thereto. In other embodiments of the disclosure, the capacitive coupling component may also be implemented as the transistor T1 of the embodiment of FIG. 3B. The electronic component 810 may include a light-emitting diode. In the embodiment of the disclosure, the electronic component 810 is electronically connected between a first operation voltage V1 and the current sink circuit 830. A first terminal of the scan transistor Ts is electrically connected to the data line DL. A second terminal of the scan transistor Ts is electrically connected to the current sink circuit 830 through a node N1. A control terminal of the scan transistor Ts is electrically connected to a scan signal SS. A first terminal of the capacitor C1 is electrically connected to the compensation signal CS. A second terminal of the capacitor C1 is electrically connected to the current sink circuit 830 through the node N1.

In the embodiment of the disclosure, the current sink circuit 830 includes a driving transistor Td and a storage capacitor Cst. In the embodiment of the disclosure, a first terminal of the driving transistor Td is electrically connected to the electronic component 810. A second terminal of the driving transistor Td is electrically connected to a second operation voltage V2. The second terminal of the capacitor C1 is electrically connected to a control terminal of the driving transistor Td, a first terminal of the storage capacitor Cst and the second terminal of the scan transistor Ts through the node N1. The second terminal of storage capacitor Cst is electrically connected to the second operation voltage V2. In the embodiment of the disclosure, the scan transistor Ts and the driving transistor Td may be an N-type transistor or a P-type transistor, respectively.

In the embodiment of the disclosure, the scan transistor Ts transfers a data voltage Vdata to the node N1 according to a data signal DS transmitted by the data line DL, and the current sink circuit 830 may generate a driving current Id to drive the electronic component 810 according to the data voltage Vdata. In the embodiment of the disclosure, during an emission period, the voltage of the control terminal of the driving transistor Td may be maintained at the voltage of the data voltage Vdata. In the embodiment of the disclosure, during the scan transistor Ts is switched from turn-on to turn-off, the scan transistor Ts may cause the clock feedthrough effect at the control terminal of the driving transistor (the node N1) by a coupling capacitor between the control terminal and the second terminal of the scan transistor Ts. In the embodiment of the disclosure, the capacitor C1 may compensate the clock feedthrough effect according to the compensation signal CS.

Figure 9:
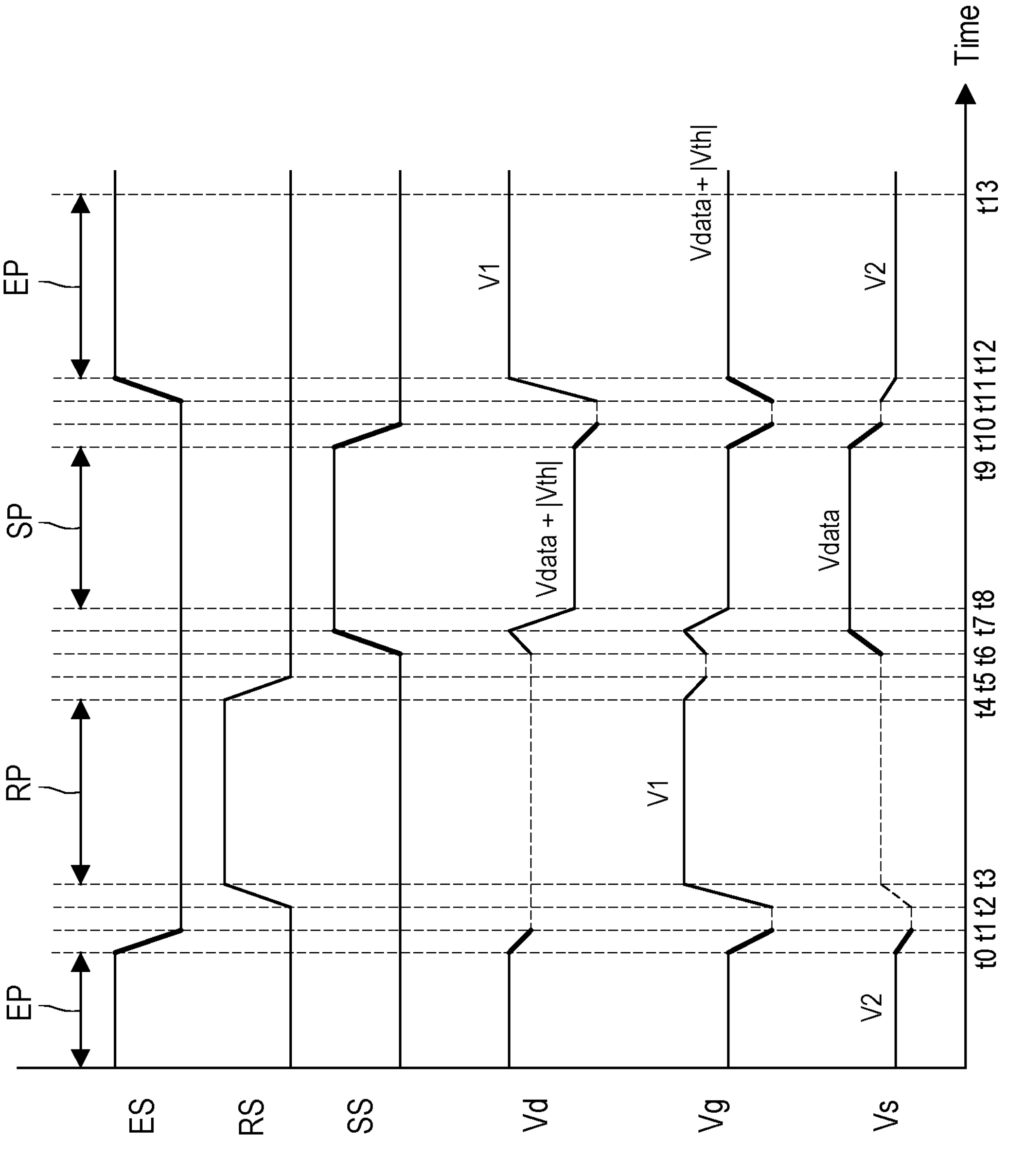
FIG. 9 is a timing diagram of related voltages and signals according to the embodiment of FIG. 7 of the disclosure.

FIG. 9 is a timing diagram of related voltages and signals according to the embodiment of FIG. 7 of the disclosure. Referring to FIG. 7 and FIG. 9, the electronic device 700 may be operated at an emission period EP, a reset period RP and a scan period SP. During the period from time t0 to time t1, the emission signal ES changes to the low voltage level, the reset signal RS and the scan signal SS maintain at the low voltage level, respectively. The voltages Vd, Vs and Vg of the first, second and control terminal of the driving transistor Td fall simultaneously. During the period from time t2 to time t3, the reset signal RS rise to the high voltage level, so the voltage Vg of the control terminal of the driving transistor Td rises to the first operation voltage V1. During the reset period RS from time t3 to time t4, the voltage Vg of the control terminal of the driving transistor Td is maintained at the first operation voltage V1. During the period from time t4 to time t5, the reset signal RS falls to the low voltage level, so the voltage Vg of the control terminal of the driving transistor Td falls simultaneously.

During the period from time t6 to time t7, the scan signal SS changes to the high voltage level, the reset signal RS and the emission signal ES maintain at the low voltage level, respectively. The voltages Vd, Vs and Vg of the first, second and control terminals of the driving transistor Td rise simultaneously. During the scan period SP from time t8 to time t9, the voltage Vs of the second terminal of the driving transistor Td changes to the data voltage Vdata. The voltages Vd and Vg of the first and control terminals of the driving transistor Td changes to the voltage of the data voltage Vdata plus the absolute value of threshold voltage Vth of the driving transistor Td.

During the period from time t9 to time t10, the scan signal SS falls to the low voltage level, so the voltages Vd, Vs and Vg of the first, second and control terminals of the driving transistor Td fall simultaneously because the clock feedthrough effect. During the period from time t11 to time t12, the emission signal ES rises to high voltage level. At the same time, the capacitor C1 may respectively compensate the clock feedthrough effect according to the emission signal ES. Thus, the voltage of the control terminal of the driving transistor Td may return to the voltage of the data voltage Vdata plus the absolute value of threshold voltage Vth of the driving transistor Td. Therefore, during the emission period EP from time t12 to time t13, the voltage Vg of the control terminal of the driving transistor Td may be maintained at the voltage of the data voltage Vdata plus the absolute value of threshold voltage Vth of the driving transistor Td.

In addition, the relevant voltages and signals in the above-mentioned embodiment of FIG. 8 may also be analogized by this embodiment, so as to realize clock feedthrough effect compensation.

In summary, the electronic device of the disclosure can effectively reduce or eliminate the clock feedthrough effect caused by the scan transistor and/or the compensation transistor, so as to effectively drive the electronic component. Moreover, the electronic device of some embodiments of the disclosure may have the compensation function of the threshold voltage of the driving transistor.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:
- a first scan transistor;
- a driving transistor, electrically connected to the first scan transistor;
- an electronic component, electrically connected to the driving transistor at a first node; and
- a first capacitive coupling component, wherein a first terminal of the first capacitive coupling component is electrically connected to a control terminal of the driving transistor,
- wherein during a bias period after the driving transistor is reset in a reset period and is driven in a scan period and before the driving transistor is reset again, a signal is applied to the first capacitive coupling component to compensate a node voltage of the first node, wherein in a frame, the scan period is after the reset period, and the bias period is after scan period.

2. The electronic device according to claim 1, wherein the first capacitive coupling component comprises a capacitor.

3. The electronic device according to claim 1, wherein the first capacitive coupling component comprises a transistor, and a second terminal of the transistor is electrically connected to a first terminal of the transistor.

4. The electronic device according to claim 1, further comprising:
- a second capacitive coupling component,
- wherein the second capacitive coupling component is electrically connected to a first terminal of the driving transistor.

5. The electronic device according to claim 4, wherein a second terminal of the first capacitive coupling component is electrically connected to a second terminal of the second capacitive coupling component.

6. The electronic device according to claim 4, wherein the second capacitive coupling component comprises a capacitor.

7. The electronic device according to claim 4, wherein the second capacitive coupling component comprises another transistor, and a second terminal of the another transistor is electrically connected to a first terminal of the another transistor.

8. The electronic device according to claim 4, further comprising:
- a second scan transistor, wherein the second scan transistor is electrically connected to the first terminal of the driving transistor and the first terminal of the second capacitive coupling component.

9. The electronic device according to claim 8, wherein the first scan transistor and the second scan transistor is further electrically connected to same scan signal, respectively.

10. The electronic device according to claim 8, wherein the first scan transistor and the second scan transistor is further electrically connected to same data line.

11. The electronic device according to claim 1, further comprising:
- a compensation transistor, electrically connected between a second terminal of the driving transistor and the control terminal of the driving transistor.

12. The electronic device according to claim 1, further comprising:
- a storage capacitor, electrically connected to the control terminal of the driving transistor.

13. The electronic device according to claim 1, further comprising:
- a reset transistor, electrically connected to the control terminal of the driving transistor.

14. The electronic device according to claim 1, wherein the electronic component comprises a tunable component or a light emitting diode.

15. The electronic device according to claim 1, wherein a second terminal of the first capacitive coupling component is electrically connected to a bias signal.

16. The electronic device according to claim 1, wherein a second terminal of the first capacitive coupling component is electrically connected to an emission signal.

17. The electronic device according to claim 1, wherein a second terminal of the first capacitive coupling component is electrically connected to a compensation signal.

18. The electronic device according to claim 1, wherein the first scan transistor is further electrically connected to a data line.

19. The electronic device according to claim 1, further comprising:

a bias transistor, electrically connected to a second terminal of the driving transistor.

20. The electronic device according to claim 1, further comprising:

a first emission transistor, electrically connected to a first terminal of the driving transistor; and a second emission transistor, electrically connected to a second terminal of the driving transistor.

* * * * *